(12) United States Patent
Duong et al.

(10) Patent No.: US 10,235,126 B2
(45) Date of Patent: Mar. 19, 2019

(54) METHOD AND SYSTEM OF ON-THE-FLY AUDIO SOURCE SEPARATION

(71) Applicant: INTERDIGITAL CE PATENT HOLDINGS, Paris (FR)

(72) Inventors: Quang Khanh Ngoc Duong, Rennes (FR); Alexey Ozerov, Rennes (FR); Dalia Elbadawy, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 15/311,159

(22) PCT Filed: May 11, 2015

(86) PCT No.: PCT/EP2015/060369
§ 371 (c)(1),
(2) Date: Nov. 14, 2016

(87) PCT Pub. No.: WO2015/173192
PCT Pub. Date: Nov. 19, 2015

(65) Prior Publication Data
US 2017/0075649 A1    Mar. 16, 2017

(30) Foreign Application Priority Data
May 15, 2014   (EP) ................................ 14305712

(51) Int. Cl.
    *G06F 17/00*     (2006.01)
    *G06F 3/16*     (2006.01)
    *G10L 21/0272*     (2013.01)

(52) U.S. Cl.
    CPC .......... *G06F 3/165* (2013.01); *G10L 21/0272* (2013.01)

(58) Field of Classification Search
    CPC ................ G06F 3/165; G10L 21/0272; H04M 3/50–3/537
(Continued)

(56) References Cited

U.S. PATENT DOCUMENTS

2005/0222840 A1* 10/2005 Smaragdis .......... G10L 21/0272
                                                                704/204
2010/0257129 A1* 10/2010 Lyon ................. G06F 17/30743
                                                                706/12
(Continued)

FOREIGN PATENT DOCUMENTS

| EP | 2887239 | 6/2015 |
|---|---|---|
| KR | 101081050 | 11/2011 |
| WO | WO2014195132 | 12/2014 |

OTHER PUBLICATIONS

Duong et al., "An Interactive Audio Source Separation Framework Based on Non-Negative Matrix Factorization," IEEE International Conference on Acoustics, Speech, and Signal Processing, Florence, Italy, May 4, 2014, pp. 1-5.
(Continued)

*Primary Examiner* — Hemant S Patel
(74) *Attorney, Agent, or Firm* — Jeffrey M. Navon

(57) ABSTRACT

A method and a system (20) of audio source separation are described. The method comprises: receiving (10) an audio mixture and at least one text query associated to the audio mixture; retrieving (11) at least one audio sample from an auxiliary audio database; evaluating (12) the retrieved audio samples; and separating (13) the audio mixture into a plurality of audio sources using the audio samples. The corresponding system (20) comprises a receiving (21) and a processor (22) configured to implement the method.

16 Claims, 5 Drawing Sheets

(58) Field of Classification Search
USPC .................................. 700/94; 379/67.1–88.28
See application file for complete search history.

(56) References Cited

U.S. PATENT DOCUMENTS

2012/0316886 A1  12/2012  Pishehvar et al.
2013/0121506 A1   5/2013  Mysore et al.

OTHER PUBLICATIONS

Duong et al., "Under-Determined Reverberant Audio Source Separation Using a Full-Rank Spatial Covariance Model", IEEE Transactions on Audio, Speech and Language Processing, vol. 18, No. 7, Sep. 2010, pp. 1830-1840.

Fevotte et al., "Nonnegative Matrix Factorization With the Itakura-Saito Divergence—With Application to Music Analysis", Neural Computation, vol. 21, No. 3, Mar. 2009, pp. 1-35.

Lefevre et al., "Itakura-Saito Nonnegative Matrix Factorization with Group Sparstiy", IEEE International Conference on Acoustics, Speech, and Signal Processing, Prague, Czech Republic, May 22, 2011, pp. 1-4.

Magoarou et al., "Text-Informed Audio Source Separation Using Nonnegative Matrix Partial Co-Factorization", International Workshop on Machine Learning for Signal Processing (MLSP), Southampton, United Kingdom, Sep. 22, 2013, pp. 1-6.

Sun et al., "Universal Speech Models for Speaker Independent Single Channel Source Separation", Independent Single Channel Source Separation, IEEE International Conference on Acoustics, Speech, and Signal Processing (ICASSP), Vancouver, Canada, May 26, 2013, pp. 1-8.

Arberet et al., "Nonnegative Matrix Factorization and Spatial Covariance Model for Under-Determined Reverberant Audio Source Separation", International Conference on Information Science, Signal Processing and their Applications, Kuala Lumpur, Malaysia, May 10, 2010, pp. 1-4.

Smaragdis et al., "Separation by Humming: User-Guided Sound Extraction from Monophonic Mixtures", IEEE Workshop on Applications of Signal Processing to Audio and Acoustics (WASPAA), New Paltz, New York, USA, Oct. 18, 2009, pp. 69-72.

Smaragdis et al., "Supervised and Semi-Supervised Separation of Sounds from Single-Channel Mixtures", International Conference on Independent Component Analysis and Signal Separation (ICA), London, United Kingdom, Sep. 9, 2007, pp. 414-421.

Badawy et al., "On-The-Fly Audio Source Separation"; 2014 IEEE International Workshop on Machine Learning for Signal Processing (MLSP), Reims, France, Sep. 21, 2014, pp. 1-6.

Duong et al., "Temporal Annotation based Audio Source Separation Using Weighted Nonnegative Matrix Factorization", IEEE International Conference on Consumer Electronics—Berlin, Berlin, Germany, Sep. 7, 2014, pp. 1-2.

Vincent et al.; "The Signal Separation Evaluation Campaign (2007-2010): Achievements and remaining challenges", Signal Processing, vol. 92, No. 8, pp. 1928-1936, 2012.

Wang et al.; "Investigating Single-Channel Audio Source Separation Methods Based on Non-negative Matrix Factorization", Proceedings of the ICA Research Network International Workshop, Sept. 18-19, 2006, pp. 17-20, 2006.

Benaroya et al.; "Audio Source Separation With a Single Sensor", IEEE Transactions on Audio, Speech, and Language Processing. vol. 14. No. 1, Jan. 2006.

Bryan et al.; "Interactive refinement of supervised and semi-supervised sound source separation estimates", Proc. IEEE Int. Conf. on Acoustics, Speech, and Signal Processing (ICASSP), 2013, pp. 883-887.

Fevotte Cedric; "Majorization-minimization algorithm for smooth itakura-saito nonnegative matrix factorization", 2011 IEEE International Conference on Acoustics, Speech and Signal Processing (ICASSP).

Hurmalainen et al.; "Group Sparsity for Speaker Identity Discrimination in Factorisation-based Speech Recognition", In Proceedings of Interspeech 2012, Portland, Sep. 2012.

Joder et al.; "A comparative study on sparsity penalties for nmf-based speech separation: beyond lp-norms", 2013 IEEE International Conference on Acoustics, Speech and Signal Processing (ICASSP).

Makino et al.—"Blind speech separation", Springer, 2007.

O'Grady et al.; "Convolutive Non-Negative Matrix Factorisation With a Sparseness Constraint", Proceedings of the 2006 IEEE Signal Processing Society Workshop.

Simsekli et al.; "Optimal Weight Learning for Coupled Tensor Factorization With Mixed Divergences", EUSIPCO 2013.

* cited by examiner

METHOD AND SYSTEM OF ON-THE-FLY AUDIO SOURCE SEPARATION

This application claims the benefit, under 35 U.S.C. § 365 of International Application PCT/EP2015/060369 filed May 11, 2015, which was published in accordance with PCT Article 21(2) on Nov. 19, 2015 in English and which claims the benefit of European Application No. 14305712.3 filed May 15, 2014. The European and PCT applications are expressly incorporated by reference herein in their entirety for all purposes.

FIELD OF THE INVENTION

The present invention relates to a method and a system of audio source separation. In particular, the method and system utilize a combined text-and-example based approach for audio source separation. The invention further relates to a computer readable medium suitable for such a method or system.

BACKGROUND OF THE INVENTION

Audio source separation is concerned with decomposing an audio mixture into its constituent sound sources. It provides a wide range of applications in audio/speech enhancement, post-production, 3D audio, etc. Among others, Blind Source Separation (BSS) assumes that the audio source separation is performed without information about the sources, the mixture, and/or the mixing process generating the mixture. On the other hand, Informed Source Separation (ISS) allows the audio source separation to be performed with guidance from some auxiliary information.

Most of the existing approaches for supervised audio source separation are example-based methods. A prerequisite for such approaches is to beforehand acquire some audio samples similar to target audio sources, which is normally cumbersome and not always possible. When audio examples are not available beforehand, in alternative, simple text queries can be used to search for audio files. This text query based approach for audio source separation is easier for a user and more efficient, since the user only needs to listen to the audio mixture and provide words describing what they want to separate for instance. However, while a text query based approach is described in [XII], so far there is no practical solution that would be able dealing efficiently with noisy or non-representative retrieved examples.

For example-based audio source separation, single channel source separation is an underdetermined problem and thus among the most challenging ones. Several algorithms propose to take into account the pre-learned spectral characteristics of individual sound sources in order to separate them from the audio mixture. To achieve this, there is a need to acquire preliminary training data to learn and indicate the spectral characteristics of the individual target sources. A class of supervised algorithms are proposed based on non-negative matrix factorization (NMF) [I, II, III] or its probabilistic formulation known as probabilistic latent component analysis (PLCA) [IV, V]. Nevertheless, when the training data are unavailable or not representative enough for the audio sources, the above methods become inapplicable without other supplementary information about the sources. The supplementary information, for example, includes "hummed" sounds that mimic the ones in the mixture [V], or text transcriptions of the corresponding audio mixture [VI].

User-guided approaches based on NMF for audio source separation have been proposed recently [VII], whereby an overall audio source separation process might comprise several interactive separation steps. These approaches allow end-users to manually annotate information about activity of each sound source. The annotated information is used, instead of the above mentioned training data, to guide the source separation process. In addition, the user is able to review the separation result and correct the errors thereof by annotating the spectrogram displays of intermediate separation results during the separation process.

However, for the above user-guided and interactive approaches, it is required that the user has some minimum knowledge about audio source spectrograms and audio signal processing in order to manually specify characteristics of the audio sources and thus interact with the separation process. In other words, the optional interaction and interference of the audio source separation is not easy and not practical for an end-user. In addition, the annotation process is time consuming even for a professional operator.

SUMMARY OF THE INVENTION

It is an objective of the present invention to propose an improved solution for audio source separation, particularly on the simplification of user interaction such that non-experienced end-user can easily perform source separation task.

According to a first aspect of the invention, a method of audio source separation comprises: receiving an audio mixture and at least one text query associated to the audio mixture; retrieving at least one audio sample from an auxiliary audio database by matching the text query with semantic information associated to the auxiliary audio database; evaluating the audio samples retrieved from the auxiliary audio database; and separating the audio mixture into a plurality of audio sources using the retrieved audio samples. In one embodiment of the invention, evaluating the audio samples and separating the audio mixture are performed jointly by applying non-negative matrix factorization to the audio mixture and the audio samples.

Accordingly, a system configured to implement the method of audio source separation comprises: a receiving unit configured to receive an audio mixture and at least one text query associated to the audio mixture; and a processor configured to retrieve at least one audio sample from an auxiliary audio database by matching the text query with semantic information associated to the auxiliary audio database, to evaluate the audio sample retrieve from the auxiliary audio database, and to separate the audio mixture into a plurality of audio sources using the audio sample.

Also, a computer readable medium having stored therein instructions for audio source separation for an audio mixture, which when executed by a computer, cause the computer to: receive an audio mixture and at least one text query associated to the audio mixture; retrieve at least one audio sample from an auxiliary audio database by matching the text query with semantic information associated to the auxiliary audio database; evaluate the audio samples retrieved from the auxiliary audio database; and separate the audio mixture into a plurality of audio sources using the audio sample.

The method of audio source separation of this invention simplifies the process and improves the result of the source separation. With the combined text-and-sample approach, an end user is allowed to easily interact with a system to conduct the audio source separation by simply providing text query or spoken audio query describing sounds in the mixture. In the latter case a speech to text interface is used to convert spoken audio query to text query. The evaluation of the preliminarily retrieved audio sample improves the subsequent audio source separation with the provision of a better trained source samples. In one embodiment of the invention where the evaluation of the source samples and the source separation of the audio mixture are performed jointly, the whole process of audio source separation becomes more efficient.

BRIEF DESCRIPTION OF THE DRAWINGS

For a better understanding the invention shall now be explained in more detail in the following description with reference to the figures. It is understood that the invention is not limited to this disclosed exemplary embodiments and that specified features can also expediently be combined and/or modified without departing from the scope of the present invention as defined in the appended claims.

DETAILED DESCRIPTION OF PREFERRED EMBODIMENTS

Figure 1:
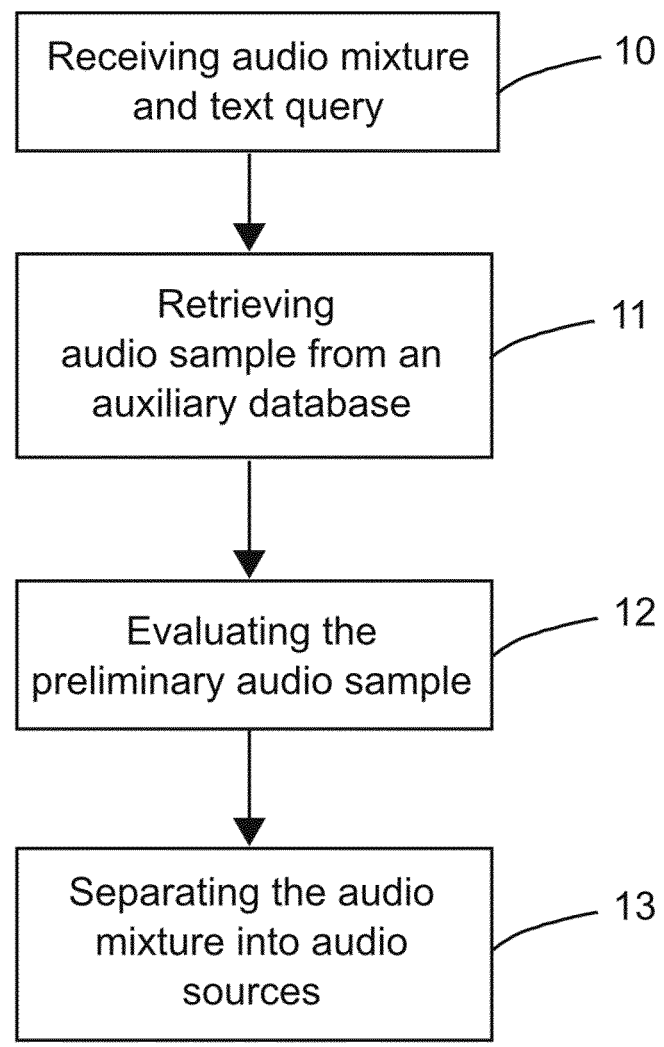
FIG. 1 is a flow chart illustrating a preferred embodiment of the method of audio source separation according to this invention.

Referring to FIG. 1, one preferred embodiment of the method of audio source separation according to the present invention comprises: receiving 10 an audio mixture and at least one text query associated to the audio mixture; retrieving 11 at least one audio sample from an auxiliary audio database by matching the text query with semantic information associated to the auxiliary audio database; evaluating 12 the audio sample retrieved from the auxiliary audio database; and separating 13 the audio mixture into a plurality of audio sources using the audio sample. The method of audio source separation can be performed in a system, and/or by a processer, a server, or any suitable devices.

The text query can be provided by a user through a user input device or the like, e.g. a typing device or a remote control. A user listens to the audio mixture, differentiates the audio sources in the audio mixture, and then arbitrarily provides the text queries. Alternatively, the text query can be provided directly by a device conducting speech-to-text or similar techniques. The text query preferably describes the audio sources included in the audio mixture, e.g. dog barking, bird singing, etc., and/or the text content of the audio mixture such as a speech context. In addition, other specified parameters such as sample rate, number of channels, type of audio file (wav, mp3, etc.) can also be included in and combined with the text query, each referring to an individual or several audio sources. Of course, the length, formality and/or other characteristics of the text query are not limited and are flexible for different demands.

The text query is subsequently used for the audio retrieval 11 of audio samples from the auxiliary database. The auxiliary audio database is a database associated with some semantic information, which preferably identifies the content of the audio data of the database. Of course, the semantic information can have any formality applicable in source separation, such as tags, file names, corresponding web pages, etc. Preferably, the auxiliary database is a public and easily-accessible database such as open search engines like Google and Findsounds. In this case the retrieved audio samples can be downloaded locally for further processing and/or a list of URLs can be provided by the auxiliary database. Alternatively, the auxiliary database can also be a local or any type of database which is preparatory for the audio source separation.

Since there is at least some semantic information associated to the auxiliary database, the retrieval of the audio samples is performed by matching the received text query with the semantic information of the auxiliary database. In other words, the audio retrieval of the audio samples can be conducted based on any known text-based audio retrieval technique in the field.

Evaluating 12 the retrieved audio samples can be performed based on various criteria by either a local server or the provider of the auxiliary database. Accordingly, the subsequent separation 13 of the audio mixture can be performed using every retrieved audio samples or only a subset thereof according to the evaluation result of the audio samples. The evaluation 12 of the audio samples can be accomplished by several methods including different algorithms.

In one embodiment of this invention, retrieving 11 and evaluating 12 the audio samples are conducted by the provider of the auxiliary database. The auxiliary database, e.g. an internet search engine, provides a list of audio samples, which are ranked according to their match with the provided text query. The sequence of the audio samples optionally starts from the best matching to the worst. Arbitrarily, a certain number of the best matches are used for the subsequent audio separation. For example, a user can decide to use only the top three audio samples and exclude the rest. In addition, the user can assign different weights for each samples based on the match score.

In one embodiment of this invention, the audio samples are ranked according to their correlation with the received audio mixture. The audio samples are temporally cross correlated with the audio mixture, and the output is summarized to obtain a score for individual audio samples. For example, a higher score can represent a better match of the audio sample with the audio mixture. Similarly, a subset of the audio samples can be chosen for subsequent audio source separation.

In another embodiment of this invention, the audio samples are ranked according to audio feature similarity, which can provide a more robust matching between the audio samples and the audio mixture. First, audio features such as spectral centroid, Mel-frequency cepstrum coefficient (MFCC), spectral spread, spectral band energy, etc., are extracted respectively from the retrieved audio samples and audio mixture. Based on the extracted features, feature vectors for audio samples and audio mixture are computed respectively and compared by normalized cross correlation. In this case, the audio samples and the audio mixture are particularly compared and matched according to the derived feature vectors, rather than the raw signals of the same. Alternative to the feature vectors, a bag-of-words representation of the audio samples and the audio mixture can be extracted, followed by comparison between the audio samples and mixture using correlation, cosine similarity or other distance metrics.

Of course, other alternative methods can also be used for evaluating 12 the audio samples retrieved from the auxiliary database. Moreover, after evaluating 12 the audio samples, weighted Non-negative Matrix Factorization [VIII, IX] can optionally be applied with more weight given to the higher ranked audio samples.

Figure 2:
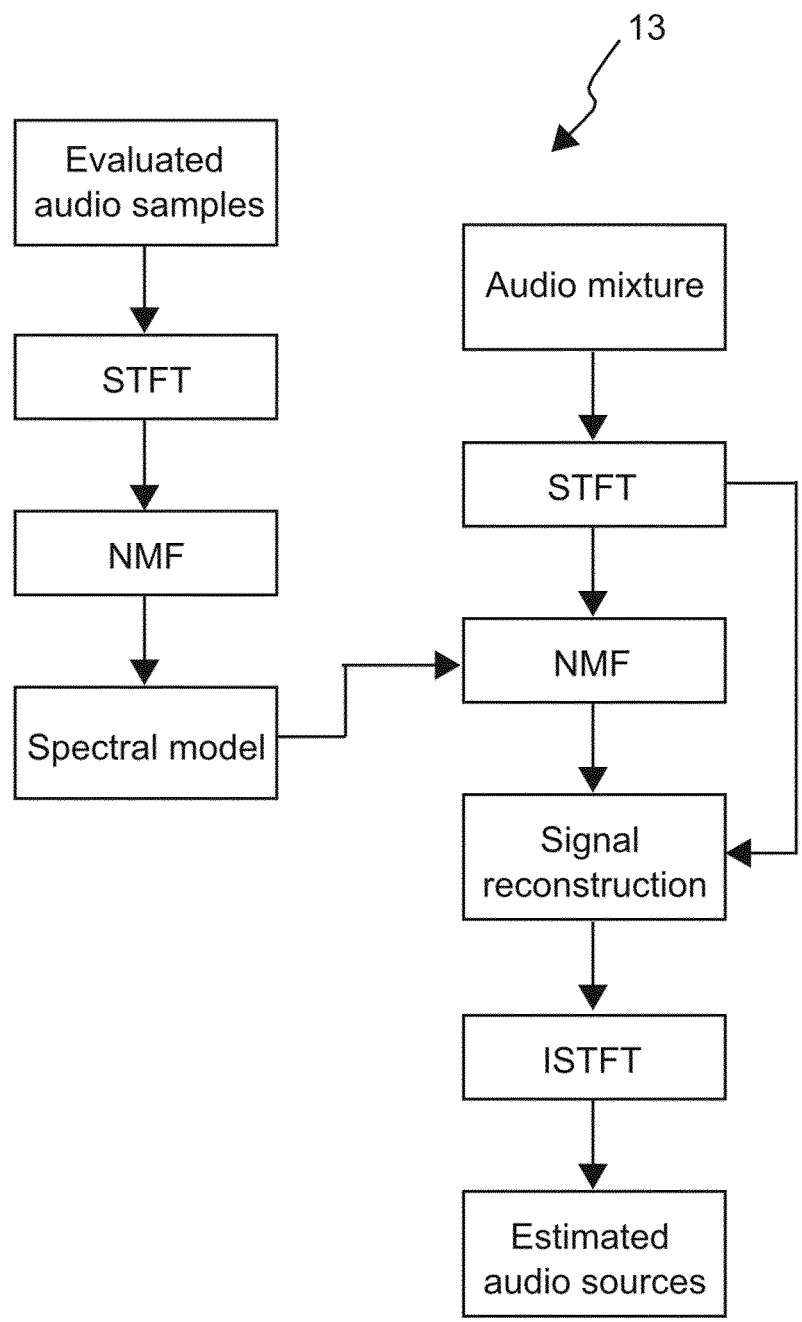
FIG. 2 is a flow chart illustrating one embodiment of the source separating stage of the method according to this invention.

FIG. 2 illustrates one preferred embodiment of the source separating stage of the method according to this invention. It should be noted that, in the following specification, a method based on NMF model is described as an example for simplicity. The on-the-fly source separation method and system can use also other spectral models such as probabilistic latent component analysis (PLCA) [IV, V] or Gaussian Mixture Model (GMM), etc.

First, the evaluated audio samples are transformed via the Short-time Fourier Transform (SIFT) into a time-frequency representation, and the amplitude or square amplitude of the STFT coefficients (known as the spectrogram, a matrix) of the audio samples is used. This matrix is factorized by non-negative matrix factorization (NMF) algorithm to obtain a spectral model matrix (W) describing spectral characteristics of audio sources, and a time activation matrix (H). The spectral matrix W is learned and used to guide the factorization of the spectrogram of the audio mixture, which is also acquired by being transformed via STFT. By applying NMF on the spectrogram of the audio mixture, where part or all columns of the spectral matrix is fixed by the pre-learned ones from the audio examples, estimated STFT coefficients of the audio sources are obtained by well-known Wiener filtering. Finally, the inverse-STFT (ISTFT) is applied to obtain the time-domain estimates of the sources so that the sources can be saved as, for example, a wave file.

The preferred embodiments of the method of this invention implement the NMF model. A conventional formulation of NMF can be defined as $V \approx \hat{V} = WH$, where V is a non-negative matrix of dimension F×N. The goal of NMF is to approximate the matrix V as a product of two simple non-negative matrices W and H respectively of dimensions F×K and K×N, and an error is minimized when the matrix V is reconstructed approximately by W·H. The error of the approximation can be measured using a variety of cost functions.

Figure 3:
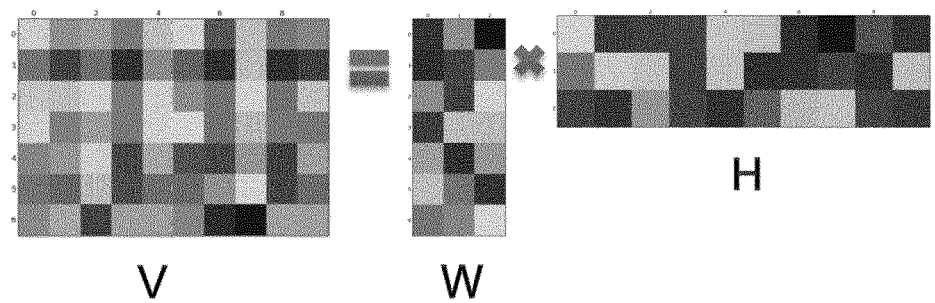
FIG. 3 is an exemplary diagram showing the NMF decomposition.

Applying the formulation of NMF, i.e., $V \approx \hat{V} = WH$, in the embodiments of this invention, V denotes a non-negative spectrogram matrix of the audio mixture, which is a time-frequency representation of the input mixture signals. W and H respectively represent spectral atoms of audio sources and their corresponding activations. F denotes the total frequency bins, N is the number of time frames, and K denotes the number of NMF components which are spectral basis describing spectral characteristics of audio sources. In other words, NMF can separate single-channel audio mixture by associating different columns of the matrix W (and corresponding rows of the matrix H) with different sound sources. FIG. 3 shows an example of the decomposition.

The aim is thus to minimize the approximation error by solving the following optimization problem:

$$\min_{W \geq 0, H \geq 0} D(V \mid WH) \text{ where}$$

$$D(V \mid WH) = \sum_{f=1}^{F} \sum_{n=1}^{n} d(v_{fn} \mid (WH)_{fn})$$

where d(.|.) is a divergence, f (frequency bin index) and n (time frame index) indicate the element in the f-th row and n-th column. Possible exemplary divergence includes the Itakura-Saito divergence [III].

Optionally, the spectral basis matrix W can be kept fixed or be updated. If the retrieved audio samples are relatively good, it is preferable to fix the learned W for further audio source separation. On the other hand, an updated W is flexible and converges to a better approximation with regards to the input audio mixture. Alternatively, another option is to first fix the matrix W during the first parameter updating iterations, followed by adjusting and updating W in later iterations, which is to better adapt the spectral characteristics of the audio sources in the audio mixture.

Figure 4:
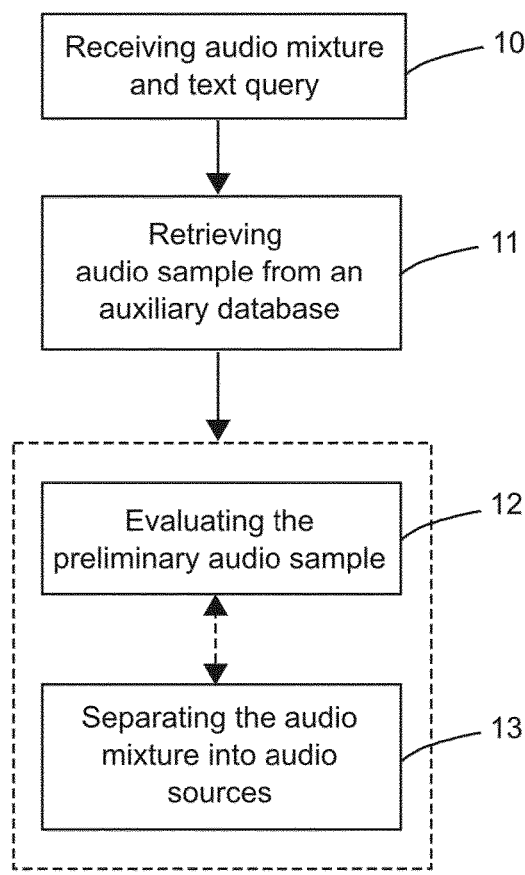
FIG. 4 is a flow chart illustrating another preferred embodiment of the method according to this invention.

FIG. 4 shows another preferred embodiment of the method of audio source separation according to the present invention. In this embodiment, evaluating 12 the audio sample and separating 13 the audio mixture are performed jointly. In other words, no evaluation is conducted beforehand the audio source separation, and all the retrieved audio samples are provided as input for the audio source separating stage.

In general, evaluating the audio samples and separating the audio mixture are performed jointly by applying non-negative matrix factorization to the audio mixture with the use of a large spectral pattern dictionary constructed by concatenating spectral pattern matrices learned from audio examples for the different sources. More specifically, as an example of two sources, the matrix of spectral patterns is first constructed as $W=[W_{11}, \ldots, W_{1P}, W_{21}, \ldots, W_{2Q}]$, where P and Q are the number of retrieved examples for source 1 and 2, respectively, and $W_{1P}$ (p=1, ..., P) and $W_{1q}$ (q=1, ..., Q) are matrices of spectral patterns learned by NMF from each example of source 1 (indexed by p) and source 2 (indexed by q), respectively. The matrix of time activation H is constructed in the same way, but all the entries are first randomly initialized and then updated via the optimization process. In this embodiment of the invention, penalty functions to enforce group sparsity on the matrix H are presented in a global optimization cost so as it allows to choose only the most appropriate spectral patterns learned from examples to guide the NMF decomposition of the mixture. This strategy is explained in FIG. 6 for the example case of two sources, and two examples for each source where $W_{11}$ and $W_{12}$ are the spectral patterns learned for the first source from two examples, similarly for $W_{21}$ and $W_{22}$ for the second source. The matrix H consists of the blocks $H_{11}, H_{12}, H_{21}$, and $H_{22}$ which are the activations corresponding to the spectral patterns. After optimization, entries of $H_{12}$ and $H_{22}$ are zeros meaning that only one retrieved example (indexed 1) for each source has been automatically selected to guide the separation process.

To integrate the evaluation of audio samples directly in the audio source separation which implements the NMF model, a sparsity penalty on the activation matrix H, $\Psi(H)$, is introduced in the NMF cost function:

$$\min_{W \geq 0, H \geq 0} D(V \mid WH) + \lambda \Psi(H)$$

where D(V|WH) is defined as above, and λ is a trade-off parameter weighting the contribution of the sparsity constraint.

Figure 5:
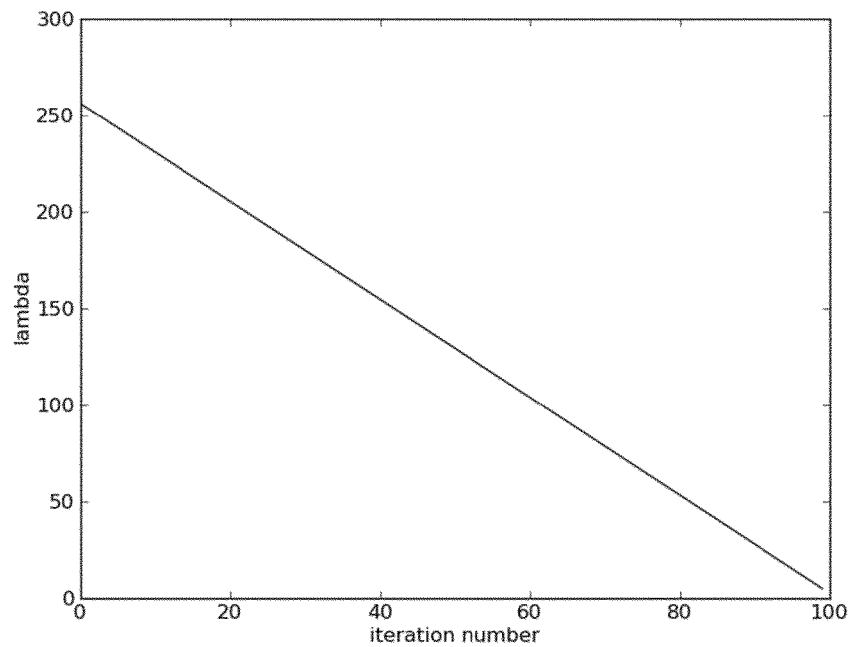
FIG. 5 is a diagram illustrating one embodiment that the trade-off parameter λ in the optimization function formulation of the NMF application adaptively changed during the iterative process.

Optionally and preferably, the trade-off parameter λ in the cost function formulation can be adaptive λ=f(i), where f is a function and i is the iteration number in the parameter updating process. The idea is to first have a high λ to give more weight to the sparsity penalty and thus choose the base audio samples, followed by gradually decreasing the λ to fit better the first term, i.e., the divergence D(V|WH), to get a better approximation. Examples of this strategy in linearly adapting the trade-off parameter λ are shown is FIG. 5.

In [II], more detailed derivation and explanation of iterative algorithm with multiplicative updates to optimize the above mentioned cost functions are described.

$$H \leftarrow H \cdot \left( \frac{W^T(V \cdot \hat{V}^{-2})}{W^T \hat{V}^{-1} + \lambda P} \right)$$

$$W \leftarrow W \cdot \left( \frac{(V \cdot \hat{V}^{-2}) \cdot H^T}{\hat{V}^{-1} H^T + \lambda R} \right)$$

By choosing different sparsity penalties, several optimization schemes are achieved, which underlies different ways of exploiting the spectral characteristics of audio samples to guide the separation process. Given the proposed sparsity penalties as below, the corresponding update rules for the corresponding parameter estimation can be derived.

In one embodiment, the sparsity penalty is defined as:

$$\Psi_1(H) = \sum_{g=1}^{G} \Psi(\epsilon + \|H_g\|_1)$$

where G denotes the number of groups, which corresponds to the number of used audio samples, and $H_g$ is part of the activation matrix H corresponding to the g-th source (g-th group). Ψ(x) can be defined by different functions as shown, e.g. in [I, II]. One example is Ψ(x)=log(x) which is used in the embodiments for simplicity. Of course, different functions Ψ can also be used.

Figure 6:
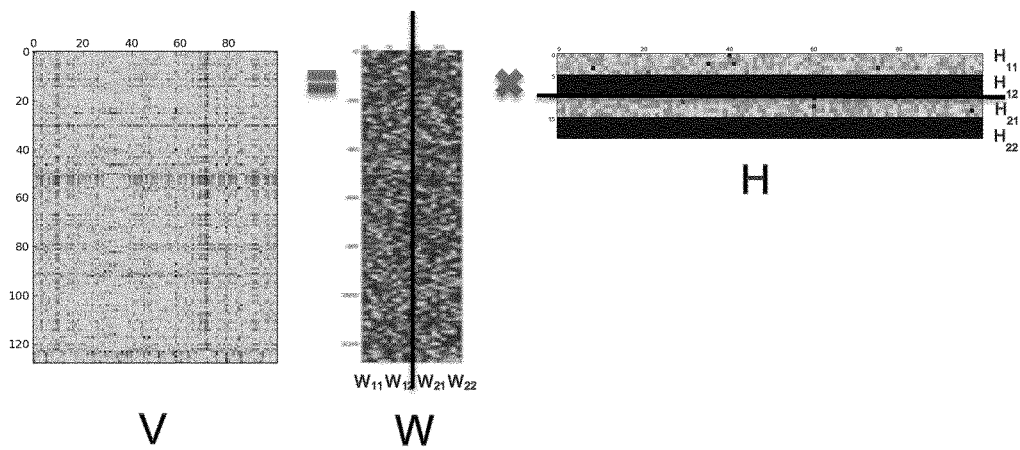
FIG. 6 is an exemplary diagram showing the effect of group sparsity penalty approach for the NMF application of this invention.

This group sparsity approach allows to efficiently performing the evaluation and selection of relevant training source samples retrieved from the auxiliary database, where a group represents one training audio sample. As an improvement of [I] where it is assumed that a good model for only one source is acquired, in this embodiment, more models for all the audio sources are generally learned and achieved. As shown in FIG. 6, the activation matrix H is forced to contain few blocks of activations which correspond to higher ranked audio samples.

In one embodiment, the sparsity penalty is defined as:

$$\Psi_2(H) = \sum_{g=1}^{K} \log(\epsilon + \|h_g\|_1)$$

where $h_g$ is the g-th row of the activation matrix. This row sparsity approach allows more flexibility and to choose the best spectral atoms even from different audio samples.

In one embodiment, a paired group sparsity approach is applied, where the sparsity penalty is defined as:

$$\Psi(H) = \sum_{g_1=2}^{G_1} \sum_{g_2=1}^{G_2} \log(\epsilon + \|H_{g_1}\|_1 + \|H_{g_2}\|_1)$$

It is defined that the group as a pair of training audio samples each from one audio source to avoid a scenario where the sparsity penalty keeps only one activated group from only one source. This approach can keep at least one activated group in each audio source.

In another embodiment, similarly, the approach is based on paired row sparsity, where the sparsity penalty is defined as:

$$\Psi(H) = \sum_{g_1=1}^{K_1} \sum_{g_2=1}^{K_2} \log(\epsilon + \|h_{g_1}\|_1 + \|h_{g_2}\|_1)$$

Figure 7:
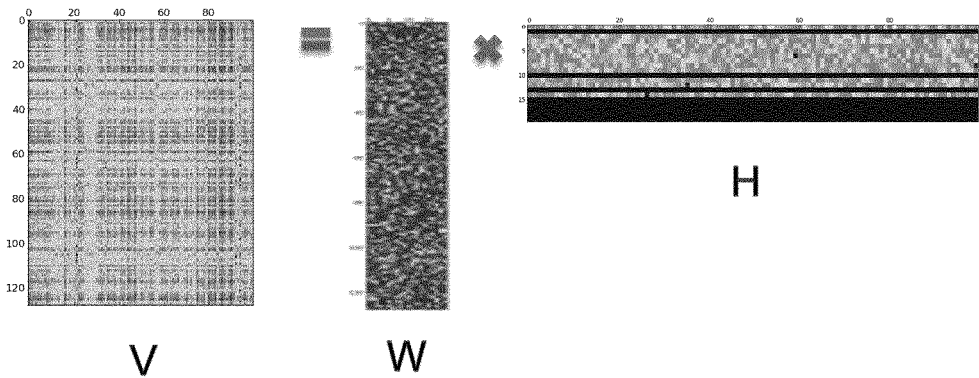
FIG. 7 is an exemplary diagram showing the effect of the combined group and row sparsity penalty approach for the NMF application of this invention.

Preferably, in yet another embodiment, a combined group and row sparsity approach is applied. The cost function for this mixed approach is defined as:

$$\min_{W \geq 0, H \geq 0} D(V \mid WH) + \alpha \Psi_1(H) + \beta \Psi_2(H)$$

where ∝ and β are weights to determine the contribution of each penalty. This approach can be visualized as in FIG. 7 where the algorithm can choose good spectral patterns from different sources.

In another embodiment of this invention, the considered spectral models can be combined with spatial models [X] so as to perform on-the-fly source separation in multichannel audio mixtures. The extension of the considered framework to multichannel case is straighforward and described, for example, in [XI].

Figure 8:
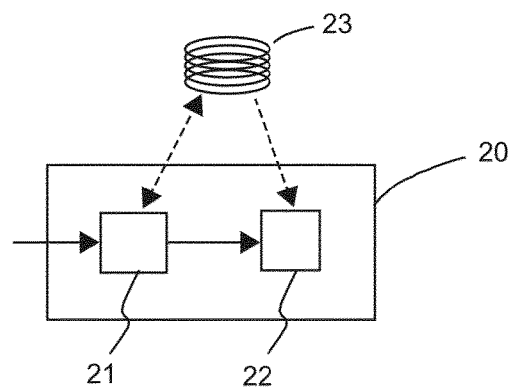
FIG. 8 is a schematic diagram illustrating a system implementing the method of audio source separation according to this invention.

FIG. 8 schematically illustrates a preferred embodiment of a system 20 configured to perform the method of audio source separation according to present invention. The system 20 comprises a receiving unit 21 configured to receive 10 an audio mixture and at least one text query associated to the audio mixture; and a processor 22 configured to retrieve 11 at least one audio sample from an auxiliary audio database 23 by matching the text query with semantic information associated to the auxiliary audio database 23, to evaluate 12 the audio sample retrieve from the auxiliary audio database 23, and to separate 13 the audio mixture into a plurality of audio sources using the audio sample.

Preferably, the processor 22 evaluates 12 the audio sample and separates 13 the audio mixture jointly. More preferably, the processor 22 separates 13 the audio mixture by applying NMF to the received audio mixture.

REFERENCES

[I] D. L. Sun and G. J. Mysore. "Universal Speech Models for Speaker Independent Single Channel Source Separation," IEEE International Conference on Acoustics, Speech, and Signal Processing (ICASSP), May 2013.

[II] A. Lefevre, F. Bach, and C. Fevotte. "Itakura-Saito Non-negative Matrix Factorization with Group Sparsity,". ICASSP 2011.

[III] C. Fevotte, N. Bertin, and J. Durrieu. "Non-negative Matrix Factorization with the Itakura-Saito divergence.

With Application to Music Analysis,". Neural Computation Vol. 21 No. 3. March 2009.

[IV] P. Smaragdis, B. Raj, and M. Shashanka, "Supervised and semi-supervised separation of sounds from single-channel mixtures," in Proc. Int. Conf. on Independent Component Analysis and Signal Separation (ICA), 2007, pp. 414-421.

[V] P. Smaragdis and G. J. Mysore, "Separation by humming: User-guided sound extraction from monophonic mixtures," in Proc. IEEE Workshop on Applications of Signal Processing to Audio and Acoustics (WASPAA), 2009, pp. 69-72.

[VI] L. L. Magoarou, A. Ozerov, and N. Q. K. Duong, "Text-informed audio source separation using nonnegative matrix partial co-factorization," in Proc. Int. Workshop on Machine Learning for Signal Processing (MLSP), 2013.

[VII] N. Q. K. Duong, A. Ozerov, L. Chevallier, and J. Sirot, "An interactive audio source separation framework based on nonnegative matrix factorization," Proc. ICASSP 2014

[VIII] N. Q. K. Duong, A. Ozerov, and L. Chevallier "Method of audio source separation and corresponding apparatus," European Patent Application No. 13305759.6

[IX] N. Q. K. Duong, A. Ozerov, and L. Chevallier, "Temporal annotation based audio source separation using weighted nonnegative matrix factorization", Proc. IEEE ICCE-Berlin, submitted, 2014.

[X] N. Q. K. Duong, E. Vincent and R. Gribonval, "Underdetermined reverberant audio source separation using a full-rank spatial covariance model," IEEE Transactions on Audio, Speech and Language Processing, Special Issue on Processing Reverberant Speech, Vol. 18, No. 7, pp. 1830-1840, September 2010

[XI] S Arberet, A. Ozerov, N. Q. K Duong, E. Vincent, R Gribonval, F. Bimbot and P Vandergheynst, "Nonnegative matrix factorization and spatial covariance model for under-determined reverberant audio source separation," Proc. International Conference on Information Science, Signal Processing and their Applications (ISSPA. IEEE), 2010

The invention claimed is:

1. A method of audio source separation for an audio mixture, performed by a processor, comprising:
   receiving an audio mixture and at least one text query associated with the audio mixture;
   retrieving at least one audio sample from an auxiliary audio database by matching the text query with semantic information associated with the auxiliary audio database;
   evaluating the at least one audio sample retrieved from the auxiliary audio database; and
   separating the audio mixture into a plurality of audio sources using the at least one audio sample.

2. The method of claim 1, wherein separating the audio mixture uses a subset of the at least one audio sample according to the evaluation result of the audio samples.

3. The method of claim 1, wherein evaluating the at least one audio sample includes ranking the at least one audio sample according to a match with the received text query.

4. The method of claim 1, wherein evaluating the audio samples includes ranking the at least one audio sample according to a correlation with the received audio mixture.

5. The method of claim 1, wherein evaluating the at least one audio sample includes ranking the at least one audio sample according to audio feature similarity between the at least one audio sample and the received audio mixture.

6. The method of claim 1, wherein the auxiliary audio database includes an internet search engine.

7. The method according to claim 1, wherein separating the audio mixture includes applying non-negative matrix factorization (NMF) to the audio mixture.

8. The method of claim 1, wherein evaluating the at least one audio sample and separating the audio mixture are performed jointly.

9. The method of claim 8, wherein evaluating the at least one audio sample and separating the audio mixture are performed jointly by applying non-negative matrix factorization (NMF) to the audio mixture and the audio samples.

10. The method of claim 9, wherein evaluating the at least one audio sample is performed by introducing a cost function in the NMF application, wherein the cost function includes a parameter of sparsity penalty so as to allow to choose spectral patterns learned from the retrieved audio examples to guide the decomposition of the mixture.

11. The method of claim 10, wherein the parameter of sparsity penalty is associated with a trade-off parameter which is adaptively modified in a parameter updating process.

12. A system of audio source separation for an audio mixture, comprising:
   a receiving unit configured to receive an audio mixture and at least one text query associated to the audio mixture; and
   a processor configured to retrieve at least one audio sample from an auxiliary audio database by matching the text query with semantic information associated to the auxiliary audio database, to evaluate the audio sample retrieved from the auxiliary audio database, and to separate the audio mixture into a plurality of audio sources using the audio sample.

13. The system of claim 12, wherein the processor separates the audio mixture by applying non-negative matrix factorization (NMF) to the audio mixture.

14. The system of claim 12, wherein the processor evaluates the audio sample and separates the audio mixture jointly.

15. A non-transitory computer readable medium having stored therein instructions for audio source separation for an audio mixture, which when executed by a computer, cause the computer to:
   receive an audio mixture and at least one text query associated with the audio mixture;
   retrieve at least one audio sample from an auxiliary audio database by matching the text query with semantic information associated with the auxiliary audio database;
   evaluate the at least one audio sample retrieved from the auxiliary audio database; and
   separate the audio mixture into a plurality of audio sources using the at least one audio sample.

16. A method of audio source separation for an audio mixture, performed by a processor, comprising:
   receiving an audio mixture and at least one text query associated with the audio mixture;
   retrieving at least one audio sample from an auxiliary audio database by matching the text query with semantic information associated with the auxiliary audio database;
   evaluating the at least one audio sample retrieved from the auxiliary audio database; and
   separating the audio mixture into a plurality of audio sources using the at least one audio sample, said evaluating and separating being performed jointly by applying non-negative matrix factorization (NMF) to the audio mixture and the audio samples.

* * * * *